No. 805,119. PATENTED NOV. 21, 1905.
E. M. COYNE.
BRAKE FOR HOISTING MECHANISMS.
APPLICATION FILED MAR. 17, 1905.

2 SHEETS—SHEET 1.

WITNESSES:
Julius Lankes
Harry Harris

INVENTOR
Edmund M. Coyne,
BY
Emil Neukart
ATTORNEY

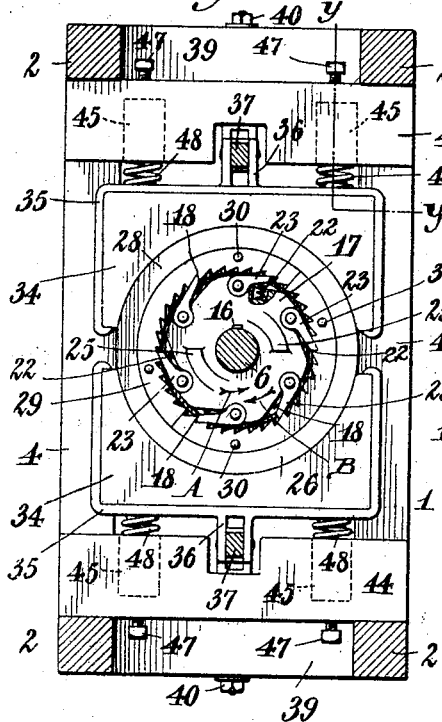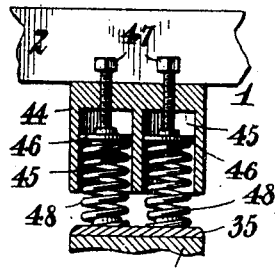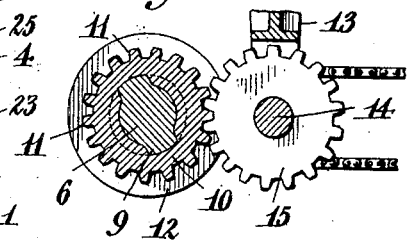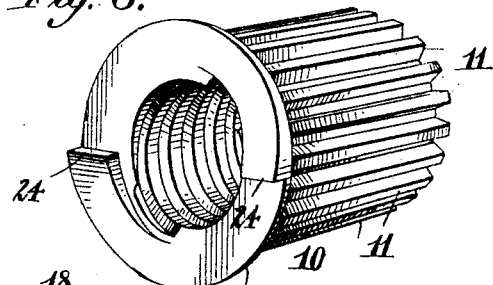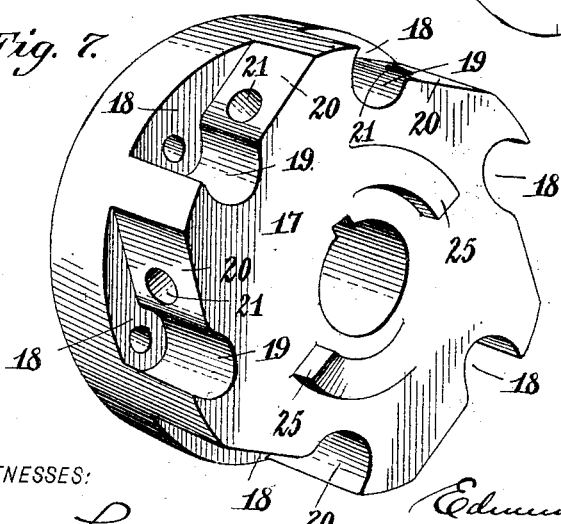

UNITED STATES PATENT OFFICE.

EDMUND M. COYNE, OF WEST SENECA, NEW YORK, ASSIGNOR OF ONE-HALF TO WILLIAM U. HEVERLY, OF BUFFALO, NEW YORK.

BRAKE FOR HOISTING MECHANISMS.

No. 805,119.     Specification of Letters Patent.     Patented Nov. 21, 1905.

Application filed March 17, 1905. Serial No. 250,653.

*To all whom it may concern:*

Be it known that I, EDMUND M. COYNE, a citizen of the United States, residing in the town of West Seneca, in the county of Erie and State of New York, have invented certain new and useful Improvements in Brakes for Hoisting Mechanisms, of which the following is a specification.

My invention relates to brakes for hoisting-machines; and it is primarily designed for use on electric traveling cranes, its purpose being to check the accidental descent of objects being raised and lowered with such cranes.

While particularly designed for use on electric traveling cranes, the adaptability of this brake is not limited to such machines, but may be used without departing from the principle involved or the combination of elements and devices claimed hereinafter in all places where brakes are of use.

The mechanism or parts or devices employed provide for carrying down the load at the desired speed and with an even movement, the resistance caused by the braking action being regulated to a nicety and the mechanism employed being capable of varying the braking power in proportion to the load, so that positive action is provided at all times and full control obtained irrespective of the load or conditions under which the hoisting apparatus may be used.

My invention in addition to possessing the above-stated advantage has for its object to provide a simple, durable, and powerful brake in which the number of parts employed is reduced to a minimum, to provide a compact and reliable brake that can be applied to any style of hoisting-machine, and to otherwise improve on brakes now in use.

To these ends my invention consists in the construction, arrangement, and combination of parts and devices to be hereinafter described, and particularly pointed out in the appended claims.

Figure 1:
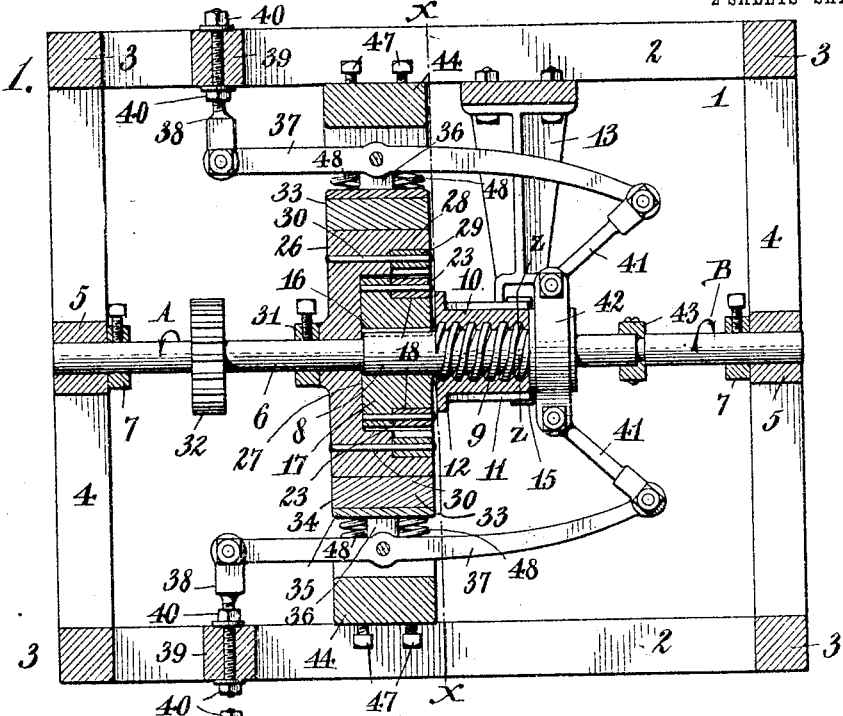
Figure 2:
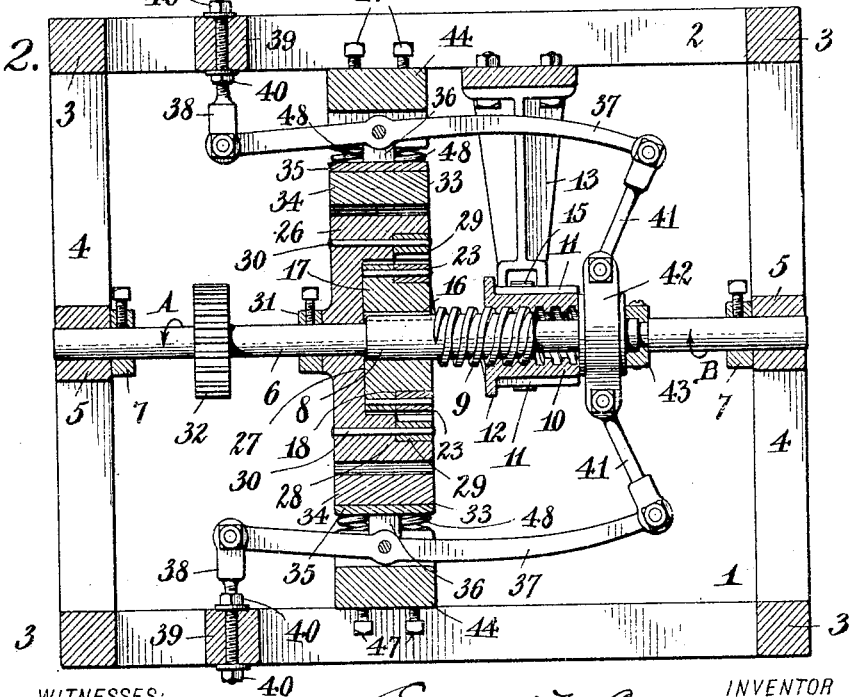

In the accompanying drawings, Figure 1 is a vertical longitudinal section of the brake and the supporting-frame therefor, the several parts being relatively positioned to elevate a load. Fig. 2 is a similar view with the parts arranged to lower a load of light weight, the position of the parts being the extreme opposite to the position of the same shown in Fig. 1. Fig. 3 is a transverse vertical section taken on line $x$ $x$, Fig. 1. Fig. 4 is an enlarged vertical section taken on line $y$ $y$, Fig. 3. Fig. 5 is an enlarged vertical section taken on line $z$ $z$, Fig. 1, the driving-gear being shown in elevation. Fig. 6 is an enlarged detached perspective view of the brake-shifting gear-sleeve. Fig. 7 is an enlarged detached perspective view of the clutch-disk.

Referring to the drawings in detail, corresponding numerals of reference designate corresponding parts in the several figures.

The reference-numeral 1 designates the supporting-frame, which may be of any construction and forming part of the hoisting-machine or independent of the latter, as may be desired. For illustration purposes merely I have shown a frame comprising longitudinal beams 2, upper and lower cross-beams 3, corner-uprights 4, and intermediate journal-beams 5 between the upper and lower cross-beams. Journaled in the frame, herein shown as in the journal-beams 5, is a longitudinally-disposed shaft 6, having stop-collars 7 to prevent endwise movement, said shaft being enlarged in diameter at 8 and having said enlarged portion provided with a double screw-thread 9, onto which is screwed for lengthwise movement on the shaft an internally-double-threaded gear-sleeve 10, whose outer face is provided with longitudinally-disposed teeth 11, and whose inner end is flanged, as at 12. Suitably journaled in a bracket 13, carried by the frame, is a shaft 14, arranged parallel with the shaft 6 and having a gear 15 held in mesh with the gear-sleeve 10, the latter being capable of moving lengthwise on the shaft 6, while maintaining meshing relation with the gear 15. The gear 15 is revolved by any suitable means, the driving device ordinarily employed being an electric motor.

Secured to the enlarged portion 8 of the shaft 6 by means of a key 16 is a clutch-disk 17, having a series of peripheral notches 18 extending through one-half its width, each notch having a curved wall 19 and an inclined wall 20. In each of the inclined walls 20 a socket 21 is formed, into which one end of a spiral spring 22 is seated. Pivotally secured in each of the peripheral notches 18 is a pawl 23, having its free end projecting outside the periphery of the clutch-disk. The free end of the spiral springs 22 bear against the inner faces of said pawls and hold the same in their projected position. The opposed faces of the gear-sleeve 10 and the clutch-disk 17 are provided with coacting oppositely-inclined lock-teeth 24 25, respectively. Said lock-teeth are arranged in pairs and are engaged when elevating a load.

26 designates a brake-wheel mounted loosely on the shaft 6 and having a central depression 27, into which fits the clutch-disk. The latter is thus surrounded by a circumferential wall 28, which is reduced in thickness at its outer end to receive an internally-toothed annulus 29, secured to said brake-wheel by rivets or bolts 30. Said annulus is preferably made in two pieces of hardened steel, and the teeth thereon are adapted to be engaged by the free ends of the pawls 23. Manifestly, the surrounding wall may be made of even thickness throughout and the teeth formed directly on the inner periphery thereof. The separate annulus, however, is preferable, as it can be quickly replaced when worn. Said brake-wheel is held between the clutch-disk and a collar 31 and cannot, therefore, move lengthwise on the shaft. The pivotal points of the pawls 23 are arranged equidistant around the clutch-disk and a like distance from the axis of said disk, and it is provided that one half the number of said pawls shall be shorter than the other half, the difference in length to be equal to one-half the length of the teeth on the annulus 29, so that in the event of the load accidentally lowering from any cause whatsoever one-half of the series of pawls will engage said annulus and check the descent of the load, the extent of drop being thus reduced to a minimum and but slight jar produced. By this arrangement the necessary depth and strength may be given the teeth while obtaining the advantage of checking the descent in one-half the distance allowed by the length of a tooth. A gear-wheel 32 is secured to the shaft and may by any suitable means be connected with the hoisting mechanism.

Lying on opposite sides of the brake-wheel are brake-shoes 33, each comprising a wooden friction-shoe 34 and a metallic frame 35, having a pair of lugs 36, between which brake-levers 37 are pivotally secured. One end of each brake-lever is fulcrumed on a bolt 38, adjustable in a cross-beam 39 on the frame, the adjustment being effected by nuts 40 on opposite sides of said beams. The opposite ends of said brake-levers are pivotally secured to inclined links 41, having their inner ends pivotally secured to a collar 42, slidable on the shaft 6 and governed in its movements along the shaft by the gear-sleeve 10. Said slidable collar is limited in its outward movement by a stop-collar 43. The brake-shoes are held against the brake-wheel by initial spring-pressure. To accomplish this, I provide cross-beams 44, which are provided with pockets 45, in which followers 46 are held and adjusted therein by bolts 47. Between said followers and the brake-shoes spiral pressure-springs 48 are located, which may be placed under the desired tension by manipulating the adjusting-bolts 47. In this manner the brake-shoes may be held against the brake-wheel with the desired initial pressure, to be augmented by the brake-levers when desired. In releasing the brake-shoes by the action of the brake-levers it may be necessary in light loads to overcome a portion of the spring-pressure, while in lowering heavy loads the pressure from the brake-levers cannot be entirely removed. This of course depends considerably on the tension under which the springs are placed.

When elevating the load, the gear-sleeve is in engagement with the clutch-disk, which is secured to the shaft, the latter, the clutch-sleeve, and the gear-sleeve being revolved in the direction of the arrow A. During such movement the pawls 23 ride over the successive teeth on the brake-wheel, and in the event of the load descending accidentally the pawls engage said teeth and by reason of the brake-wheel being held firmly against movement check the descent of the load without jar and without subjecting the parts to sudden and violent strain. When the load is elevated, the hoisting mechanism holds the same, as do also the pawls 23, which engage the teeth of the brake-wheel. On lowering the load movement is imparted to the gear-sleeve in an opposite direction by the gear 15, thereby disengaging said sleeve from the clutch-disk and forcing the slidable collar 42 outward, which causes the brake-levers to be moved outward by the action of the intervening links, thus releasing the pressure of the brake-shoes from the brake-wheel and allowing the latter, the clutch-disk engaged therewith, the shaft, and the gear-sleeve to revolve in the direction of the arrow, (designated B.)

This invention is susceptible to many changes in form, construction, and relative disposition and location of parts. The invention is not, therefore, to be confined to the specific construction herein described, as the description merely particularizes the preferred embodiment thereof.

Having thus described my invention, what I claim is—

1. In a brake mechanism, the combination of a shaft, a brake-wheel loosely mounted on the shaft, a clutch device secured to the shaft and adapted for engagement with the brake-wheel, a brake-shoe in contact with said brake-wheel, and a brake-lever pivotally connected between its ends to the brake-shoe and having one end fulcrumed and its other end arranged to be actuated.

2. In a brake mechanism, the combination of a shaft, a clutch-disk secured to said shaft and having pawls pivotally held thereon with their pivotal point arranged equidistant around said disk, said pawls being of different lengths, a brake-wheel surrounding said clutch-disk and having an annular series of teeth with which said pawls are engaged, and a brake device acting against said brake-wheel.

3. In a brake mechanism, the combination of a shaft, a brake-wheel loosely mounted on said shaft, a clutch device revoluble with the shaft and adapted for engagement with the brake-wheel, brake-shoes on opposite sides of and acting against said brake-wheel, and brake-levers fulcrumed at one of their ends and having pivotal connections between their ends with said brake-shoes, and means engaging the opposite ends of said levers for actuating the same.

4. In a brake mechanism, the combination of a shaft having a portion thereof screw-threaded, an internally-threaded sleeve fitting the threaded portion of said shaft, a slidable collar on the shaft actuated in one direction by said sleeve, means for revolving said sleeve on the shaft in either direction, a clutch device on the shaft comprising a fixed member and a loosely-mounted member, means to cause said internally-threaded sleeve to revolve with the fixed member of the clutch device, and a brake device operatively connected with said slidable collar.

5. In a brake mechanism, the combination with a suitable frame, of a shaft revoluble in said frame, a clutch device on said shaft comprising a fixed member and a loosely-mounted member, brake-shoes lying on opposite sides of said clutch device and acting against the loosely-mounted member thereof, brake-levers fulcrumed to said frame and having their fulcrum-points adjustable, said brake-levers being pivotally connected between their ends to said brake-shoes, and means for actuating said brake-levers.

6. In a brake mechanism, the combination with a suitable frame, of a shaft revoluble in said frame, a clutch device on said shaft comprising a fixed member and a loosely-mounted member, a brake-shoe acting against the loosely-mounted member of said clutch, a brake-lever pivotally connected to said brake-shoe, a bolt adjustable in the frame and having the brake-lever fulcrumed thereon, and means for actuating said lever.

7. In a brake mechanism, the combination with a suitable frame, of a shaft revolubly mounted in said frame, a clutch device on said shaft comprising a fixed member and a loosely-mounted member, a brake-shoe acting against said loosely-mounted member comprising a solid removable body and a frame carrying said removable body, springs acting against said brake-shoe, means for adjusting the pressure of said springs, and a brake-lever connected to said brake-shoe.

8. In a brake mechanism, the combination of a shaft having a portion thereof threaded, a clutch-disk secured to said shaft adjacent the threaded portion thereof and having inclined lock-teeth on the face thereof, a brake-wheel loosely mounted on the shaft and adapted to be engaged by said clutch-disk, an internally-threaded gear-sleeve engaging the threaded portion of the shaft and having inclined lock-teeth adapted to engage the teeth on said clutch-disk, a brake-shoe acting against said brake-wheel, a brake device, operative connection between said gear-sleeve and the brake device, and means for revolving the gear-sleeve on the shaft in either direction.

9. In a brake mechanism, the combination with a suitable frame, of a shaft revolubly mounted in said frame, a brake-wheel loosely mounted on said shaft and having an annular flange provided with an annular row of teeth on its inner surface, a clutch-disk secured to the shaft and having pawls adapted for engagement with said teeth, means for revolving said shaft embodying a gear-sleeve slidable on the latter and adapted for engagement with said clutch-disk to revolve the same on movement of said sleeve in one direction, and braking means connected with said gear-sleeve and adapted to act against said brake-wheel.

10. In a brake mechanism, the combination with a suitable frame, of a shaft mounted in said frame, a brake-wheel loosely mounted on said shaft, clutching means for causing said brake-wheel to revolve with the shaft, a braking device acting against the brake-wheel, and means for actuating said braking device and for engagement with said clutching means.

11. In a brake mechanism, the combination with a suitable frame, of a shaft mounted in said frame, a clutch-disk secured to said shaft and having pawls of different lengths secured thereto, a brake-wheel having an internally-toothed flange surrounding said clutch-disk with which said pawls are adapted to engage on movement of the clutch-disk in one direction and over which said pawls ride on movement of said disk in the opposite direction, brake-shoes for said brake-wheel, and driving mechanism embodying a sleeve movable lengthwise and revoluble on the shaft and having locking means to engage the clutch-disk on being revolved in one direction, and means for causing said brake-shoes to be moved from the brake-wheel on movement of said sleeve in the opposite direction.

12. In a brake mechanism, the combination with a suitable frame, of a shaft mounted in said frame and having a screw-thread thereon, a clutch-disk secured to said shaft, a brake-wheel loosely mounted on said shaft and adapted to be engaged by said clutch-disk, an internally-threaded gear-sleeve on the threaded portion of said shaft adapted for movement lengthwise of the shaft on being revolved, means for locking said gear-sleeve to the clutch-disk when revolved in one direction, a slidable collar on said shaft movable lengthwise with said gear-sleeve, brake-shoes, and mechanism between said brake-shoes and said slidable collar.

13. In a brake mechanism, the combination with a suitable frame, of a shaft mounted in said frame and having a screw-threaded portion between its ends, a clutch-disk secured to the shaft adjacent one end of said screw-threaded portion, a slidable collar on said shaft adjacent the other end of said screw-threaded portion, an internally-screw-threaded gear-sleeve engaging said screw-threaded portion and lying between said clutch-disk and said slidable collar, means for revolving said gear-sleeve, means for locking said gear-sleeve to the clutch-disk when revolved in one direction, a brake-wheel adapted to be engaged by said clutch-disk, brake-shoes for said brake-wheel, brake-levers connected to said brake-shoes, and links connecting said brake-levers with the slidable collar on the shaft.

14. In a brake mechanism, the combination with a suitable frame, of a shaft mounted in said frame, a brake-wheel loosely mounted on said shaft, a clutch device to cause said brake-wheel to revolve with said shaft, brake-shoes for said brake-wheel, brake-levers connected to said brake-shoes, and pressure-springs bearing against said brake-shoes.

15. In a brake mechanism, the combination with a suitable frame, of a shaft mounted in said frame, a brake-wheel loosely mounted on said shaft, a clutch device to cause said brake-wheel to revolve with said shaft, brake-shoes for said brake-wheel, brake-levers connected to said brake-shoes, pressure-springs bearing against said brake-shoes, and means for increasing or diminishing the pressure of said springs.

16. In a brake mechanism, the combination with a suitable frame, of a shaft mounted in said frame, a brake-wheel loosely mounted on said shaft, a clutch device to cause said brake-wheel to revolve with said shaft, a brake-shoe for said brake-wheel comprising a friction body portion and a frame in which said body portion is held, and a brake-lever attached to the frame of said brake-shoe.

In testimony whereof I have affixed my signature in the presence of two subscribing witnesses.

EDMUND M. COYNE.

Witnesses:
JULIUS LANKER,
EMIL NEUHART.